(12) United States Patent
Rapp (10) Patent No.: US 12,155,415 B2
(45) Date of Patent: Nov. 26, 2024

(54) METHOD FOR REDUCING THE IMPACT OF TRANSIENT EFFECTS IN AN OPTICAL NETWORK

(71) Applicant: ADVA Optical Networking SE, Meiningen (DE)

(72) Inventor: Lutz Rapp, Lenningen (DE)

(73) Assignee: ADVA Optical Networking SE, Meiningen (DE)

( * ) Notice: Subject to any disclaimer, the term of this patent is extended or adjusted under 35 U.S.C. 154(b) by 61 days.

(21) Appl. No.: 17/970,730

(22) Filed: Oct. 21, 2022

(65) Prior Publication Data

US 2023/0129521 A1  Apr. 27, 2023

(51) Int. Cl.
*H04B 10/2507* (2013.01)
(52) U.S. Cl.
CPC ................. *H04B 10/2507* (2013.01)
(58) Field of Classification Search
CPC .................................................. H04B 10/2507
(Continued)

(56) References Cited

U.S. PATENT DOCUMENTS 7,443,576 B2 * 10/2008 Eiselt .................. H01S 3/13013
359/337.11
7,715,093 B2 * 5/2010 Nishihara ........... H01S 3/13013
359/349

(Continued)

FOREIGN PATENT DOCUMENTS

EP  0924888 A2 * 6/1999
EP  2020767 A1 * 2/2009 ........... H04B 10/296

(Continued)

OTHER PUBLICATIONS

Meena et al; Mitigation of EDFA transient effects in variable duty cycle pulsed signals ; 2019; science Direct; pp. 1-6. (Year: 2019).*

*Primary Examiner* — Amritbir K Sandhu
(74) *Attorney, Agent, or Firm* — The Webb Law Firm (57) ABSTRACT

Provided is a method for reducing the impact of transient effects in an optical network. The optical network includes at least one span, and an optical signal having a plurality of sub-bands travels through at least one span of the at least one span of the optical network. Each of the at least one span has associated amplifiers and the associated amplifiers are connected to launch optical signals into a remainder of a corresponding optical transmission line. Respectively one of the sub-bands of the optical signal traveling through the span is amplified by one of these associated amplifiers. Each of the associated amplifiers includes at least one control element for controlling gain and tilt of the corresponding amplifier. The method includes the steps of for each span, acquiring an actual value of at least one performance parameter; for each span, respectively computing actual settings for each of the control elements included in the amplifiers associated to the corresponding span based on the actual value of the at least one performance parameter of the corresponding span; and for each span, respectively adjusting the settings of each of the control elements included in the amplifiers associated to the corresponding span based on the computed actual settings for the corresponding control element, in order to reduce the impact of transient effects.

15 Claims, 3 Drawing Sheets

(58) Field of Classification Search
USPC .......................................................... 398/147
See application file for complete search history.

(56) References Cited

U.S. PATENT DOCUMENTS

| | | | | |
|---|---|---|---|---|
| 9,065,570 B2 * | 6/2015 | Shukunami | ........ | H04B 10/2941 |
| 2003/0151799 A1 | 8/2003 | Wight et al. | | |
| 2004/0042068 A1 * | 3/2004 | Eiselt | ................. | H04B 10/2916 |
| | | | | 359/344 |
| 2008/0192333 A1 * | 8/2008 | Bolshtyansky | ..... | H04J 14/0221 |
| | | | | 359/334 |
| 2010/0129081 A1 * | 5/2010 | Onaka | ................. | H01S 3/13013 |
| | | | | 359/334 |
| 2010/0239263 A1 * | 9/2010 | Tokura | ................ | H04J 14/0246 |
| | | | | 398/94 |

FOREIGN PATENT DOCUMENTS

| | | | | | |
|---|---|---|---|---|---|
| EP | 4170934 A1 * | 4/2023 | ......... | H04B 10/2507 |
| WO | WO-2009052855 A1 * | 4/2009 | ......... | H04B 10/2942 |

\* cited by examiner

METHOD FOR REDUCING THE IMPACT OF TRANSIENT EFFECTS IN AN OPTICAL NETWORK

CROSS REFERENCE TO RELATED APPLICATION

This application claims priority to European Patent Application No. 21204152.9, filed Oct. 22, 2021, the disclosure of which is hereby incorporated by reference in its entirety.

BACKGROUND OF THE INVENTION

Field of the Invention

The present invention relates to a method for reducing the impact of transient effects in an optical network, a network control device for reducing the impact of transient effects in an optical network, and an optical network including such a network control device.

Description of Related Art

In an optical transmission technique using wavelength division multiplexing (WDM), a plurality of optical signals of wavelength channels are multiplexed and then transmitted through a single optical fiber.

Further, network operators have a strong interest in making most efficient use of their investments in the network infrastructure, and therefore, a strong interest in achieving the highest transmission capacity through the fiber optical transmission lines in the network. Therein, for most fiber optical transmission lines impairments determining the total capacity of the fiber within a given bandwidth are amplified spontaneous emission (ASE) noise from optical amplifiers along the line and fiber nonlinear effects. It is also known that the power of the optical signal launched into each span is a critical parameter of the system, which determines the capacity that can be attained.

In systems in which data is transmitted via several wavelength bands, stimulated Raman scattering in the transmission fiber causes power transfer among different wavelength channels and also across the borders of the wavelength bands. In particular, power is transferred from smaller wavelengths to larger wavelengths. In such a WDM system, a desired equal optical signal-to-noise ratio (OSNR) at the receivers is further usually achieved by introducing a pre-tilt into the spectrum at the output of each amplifier. This pre-tilt compensates for the power transfer in the transmission fiber such that all channels have equal power at the end of the corresponding fiber span.

In systems that make use of a single wavelength band only, the average per channel power at the input of the amplifiers does not change in case of a transient effect, for example a channel drop. However, it is more and more considered to transmit data via several wavelength bands, in order to further increase the spectral usage without significantly decreasing the maximum reach. In systems making use of several wavelength bands, and, in particular, systems making use of several wavelength bands and using individual amplifiers per band, the optimum average gain and the optimum pre-tilt of the individual amplifiers change with a channel drop. Therefore, there is a need for an improved method for adjusting the gain and the tilt of optical amplifiers in a multiband system, with which the OSNR of all channels can be kept almost equal even in case of transient effects.

US 2003/0151799 A1 describes a Raman module for amplifying a WDM signal with a dynamic spectrum traveling on a fiber span, comprising a detecting unit for measuring a performance parameter of the WDM signal at the Raman module, a spectral gain estimating unit for determining an estimated vector gain $Gain_{meas}$ based on the performance parameter alone, and a Raman pump unit controlled with a gain $Gain_{RA}$ evaluated based on the estimated gain $Gain_{meas}$ for generating a pump signal and launching same over the fiber span.

SUMMARY OF THE INVENTION

According to one embodiment of the invention, a method for reducing the impact of transient effects in an optical network is provided, wherein the optical network includes at least one span, and wherein an optical signal having a plurality of sub-bands travels through at least one span of the at least one span of the optical network, wherein each span has associated amplifiers, wherein the associated amplifiers are connected to launch optical signals into a remainder of a corresponding optical transmission line, and wherein respectively one of the sub-bands of the optical signal traveling through the span is amplified by one of these associated amplifiers, wherein each of the associated amplifiers includes at least one control element for controlling gain and tilt of the corresponding amplifier. Therein, for each span, an actual value of at least one performance parameter is acquired, for each span respectively actual settings for each of the control elements included in the amplifiers associated to the corresponding span are computed based on the actual value of the at least one performance parameter of the corresponding span, and, for each span, the settings of the control elements included in the amplifiers associated to the corresponding span are respectively adjusted based on the computed actual settings for the corresponding control element, in order to reduce the impact of transient effects.

Here, a transient effect is a temporary effect that might lead to performance degradation, and, for example, a temporary effect that requires adjustment of the optimum average gain and/or the optimum pre-tilt of the individual amplifiers. For example, in case of a channel drop, or a channel loss in an optical multiband network, respectively, the remaining or surviving channels, respectively, suffer power variations which can be both large and relatively fast.

Further, a band is a group of frequencies or wavelengths, respectively, containing many channels.

Here, the optical network can be a multi-span optical network. Further, the optical network is preferably a wavelength-division multiplexing (WDM) network, wherein the method can be used for any wavelength division multiplexing network that makes use of several wavelength bands, irrespective of the network topology, for example point-to-point, ring, or meshed networks, with any combination of network nodes which use amplifiers with embedded variable optical attenuators, including terminal sites, fixed optical add-drop, reconfigurable optical add-drop multiplexer, or amplifier nodes.

That each of the associated amplifiers includes at least one control element for controlling gain and tilt of the corresponding amplifier means that the corresponding amplifier includes one control element that is configured to control both gain and tilt of the corresponding amplifier, or separate control elements, or one control element that is configured to control the gain of the corresponding amplifier and one control element that is configured to control the tilt of the corresponding amplifier, respectively. The control elements can for example be a variable optical attenuator, respectively, wherein a variable optical attenuator is further a device that is configured to additionally level the power exiting an amplifier.

Furthermore, a performance parameter is a parameter, or a variable, respectively, which can be used as an indicator of a transient effect in the optical multiband network.

Therein, by correspondingly simply adjusting the settings of the control elements, a fast adaption of the optical attenuations is achieved, which allows fast gain and output power adjustment of the corresponding amplifiers in case of a transient effect, which is for example much faster than trying to change an inversion level of the corresponding amplifier. In particular, the corresponding amplifiers, or the output of the corresponding amplifiers, respectively, can be controlled in such a way that strong transients in the optical network can be avoided, whereby the transient system performance can be improved. Thus, an improved method for adjusting gain of amplifiers in a multiband system is provided, with which the OSNR of all channels can be kept almost equal even in case of transient effects.

In one embodiment, the method further comprises detecting whether a drop of one or more wavelength channels occurred, wherein, for each span, the actual value of the at least one performance parameter is only measured if it has been detected that a drop of one or more wavelength channels occurred. Thus, a method is provided with which power excursions induced by channel drops can be significantly reduced. Thereby, further the impact of the channel drops on a transmission performance can also be significantly reduced. Also, possible outage times can be strongly reduced. However, that it is detected whether a drop of one or more wavelength channels occurred should merely be understood as an example and the method can for example also be used for system control during a start-up phase.

Further, the sub-bands can include the C-band and the L-band, wherein the combination of the C-band and the L-band is the combination that is usually used in most optical networks. However, that the sub-bands include the C-band and the L-band should merely be understood as an example and the method is applicable to more or different wavelength bands, too.

Therein, the at least one performance parameter can include input powers of signals respectively inputted into the amplifiers associated to the corresponding span. By acquiring actual values of the input powers of the signals respectively inputted into the individual amplifiers, a feed-forward control of the optical amplifiers is achieved with which the system performance in case of a transient effect can be improved. Further, these input powers can respectively simply be acquired by a measurement device, for example a photodiode.

Further, the step of, for each span, respectively computing actual settings for each of the control elements included in the amplifiers associated to the corresponding span based on the actual value of the at least one performance parameter of the corresponding span can further comprise, for each amplifier of the amplifiers associated to the corresponding span, computing an actually required tilt coefficient, and for each of the control elements included in the amplifiers associated to the corresponding span, respectively computing the actual settings for the corresponding control element based on the actual value of the at least one performance parameter of the corresponding span and the actually required tilt coefficient of the corresponding amplifier.

Here, the actually required tilt coefficient is the tilt coefficient that is required to compensate for the power transfer in the transmission fiber such that all channels have equal power at the end of the corresponding fiber span after the transient effect has occurred.

Further, the actually required tilt coefficient of the corresponding amplifier is the actually required tilt coefficient that has been computed for the amplifier which includes the corresponding control element.

In particular, as the resulting power settings depend on the spectral width and the spectral distribution, the tilt coefficient required after a transient effect, for example a channel drop can be computed, wherein based on this computed actually required tilt coefficient the actual settings for the control element can easily be obtained and a fast and simple feed-forward control of the corresponding amplifier be realized, for example by computing an output power of signals outputted by the amplifier based on the corresponding acquired actual value of the at least one performance parameter, or the input power and the corresponding computed actually required tilt coefficient, respectively.

Furthermore, the step of, for each span, respectively computing actual settings for each of the control elements included in the amplifiers associated to the corresponding span based on the actual value of the at least one performance parameter can further comprise, for each of the control elements included in the amplifiers associated to the span, respectively computing a correction factor, and, for each of the control elements included in the amplifiers associated to the corresponding span, respectively computing the actual settings for the control element based on the actual value of the at least one performance parameter and the correction factor. There might for example be situations where a channel drop results in an increased impact of nonlinear fiber effects on the performance, wherein the adjustment of the settings of the control element might not generally lead to the optimized performance after the channel drop. These effects can be taken into account by utilizing the correction factor when computing the actual settings for the control element.

In one embodiment, the method further comprises the step of, for each span, respectively adjusting a pre-tilt of the amplifiers associated to the span based on the actually required tilt coefficient of the corresponding amplifier. Thus, the gain and the tilt of optical amplifiers in a multiband system can be adjusted in a two-phase process, wherein in a first phase the settings of a corresponding control element are adjusted, which allows fast gain and output power adjustment of the corresponding amplifiers in case of a transient effect, which is for example much faster than trying to change an inversion level of the corresponding amplifier. Thereafter, in a second phase, the tilt of the corresponding amplifier can be adjusted, which is a much more time-consuming process, whereafter all channels can return to their original power level.

According to another embodiment of the invention, a network control device for reducing the impact of transient effects in an optical network is provided, wherein the optical network includes at least one span, and wherein an optical signal having a plurality of sub-bands travels through at least one of the at least one span of the optical network, wherein each span has associated amplifiers, wherein the associated amplifiers are connected to launch optical signals into a remainder of a corresponding optical transmission line, and wherein respectively one of the sub-bands of the optical signal traveling through the span is amplified by one of these associated amplifiers, wherein each of the associated amplifiers includes at least one control element for controlling gain and tilt of the corresponding amplifier, wherein the network control device comprises a first receiving device, wherein the first receiving device is configured to, for each span, receive information about an actual value of at least one performance parameter of the span, a computing device, wherein the computing device is configured to, for each span, respectively compute actual settings for each of the control elements included in the amplifiers associated to the corresponding span based on the information about the actual value of the at least one performance parameter, and a first adjustment device, wherein the first adjustment device is configured to, for each span, respectively adjust the settings of each of the control elements included in the amplifiers associated to the corresponding span based on the computed actual settings for the corresponding control element, in order to reduce the impact of transient effects.

Thus, an improved network control device that is configured to adjust gain of optical amplifiers in a multiband system is provided, with which the OSNR of all channels can be kept almost equal even in case of transient effects. Therein, as the network control device is configured to simply adjust the settings of the control elements, a fast adaption of the control elements is achieved, which allows fast gain and output power adjustment of the corresponding amplifiers in case of a transient effect, which is for example much faster than trying to change an inversion level of the corresponding amplifier. In particular, the corresponding amplifiers, or the output of the corresponding amplifiers, respectively, can be controlled in such a way that strong transients in the optical network can be avoided, whereby the transient system performance can be improved.

The network control device can further comprise a second receiving device, wherein the second receiving device is configured to receive information about whether a drop of wavelength channels occurred, wherein the first receiving device is configured to, for each span, receive the information about the actual value of the at least one performance parameter only if the second receiving device has received information that a drop of wavelength channels occurred. Thereby, a network control device is provided with which power excursions induced by channel drops can be significantly reduced. Thereby, further the impact of the channel drops on a transmission performance can also be significantly reduced. Also, possible outage times can be strongly reduced.

In one embodiment the at least one performance parameter can include input powers of signals respectively inputted into the amplifiers associated to the corresponding span. By acquiring actual values of the input powers of the signals respectively inputted into the individual amplifiers, a feed-forward control of the optical amplifiers is achieved with which the system performance in case of a transient effect can be improved. Further, these input powers can respectively simply be acquired by a measurement device, for example a photodiode.

The computing device can further comprise a first computing unit, wherein the first computing unit is configured to, for each amplifier associated to a span, compute an actually required tilt coefficient, and a second computing unit, wherein the second computing unit is configured to, for each of the control elements included in the amplifiers associated to the corresponding span, respectively compute the actual settings for the corresponding control element based on the information about the actual value of the at least one performance parameter of the corresponding span and the actually required tilt coefficient of the corresponding associated amplifier. As the resulting power settings depend on the spectral width and the spectral distribution, the tilt coefficient required after a transient effect, for example a channel drop can be computed, wherein based on this computed actually required tilt coefficient the actual settings for the control element can easily be obtained and a fast and simple feed-forward control of the corresponding amplifier be realized, for example by computing an output power of signals outputted by the amplifier based on the corresponding information about the actual value of the at least one performance parameter, or the input power and the corresponding computed actually required tilt coefficient, respectively.

Furthermore, the computing device can also comprise a third computing unit, wherein the third computing unit is configured to, for each of the control elements of the amplifiers associated to a span, compute a correction factor, and a fourth computing unit, wherein the fourth computing unit is configured to, for each of the control elements included in the amplifiers associated to the corresponding span, respectively compute the actual settings for the corresponding control element based on the information about the actual value of the at least one performance parameter and the correction factor. There might be situations where a channel drop results in an increased impact of nonlinear fiber effects on the performance, wherein the adjustment of the settings of the control element might not generally lead to the optimized performance after the channel drop. These effects can be taken into account by the network control device being configured to utilize the correction factor when computing the actual settings for the control element.

In one embodiment, the network control device further comprises a second adjustment device, wherein the second adjustment device is configured to, for each span, respectively adjust a pre-tilt of the amplifiers associated to the span based on the actually required tilt coefficient of the corresponding amplifier. Thus, the network control device can be configured to adjust the gain and the tilt of optical amplifiers in a multiband system in a two-phase process, wherein in a first phase the settings of a corresponding control element are adjusted, which allows fast gain and output power adjustment of the corresponding amplifiers in case of a transient effect, which is for example much faster than trying to change an inversion level of the corresponding amplifier. Thereafter, in a second phase, the tilt of the corresponding amplifier can be adjusted, which is a much more time-consuming process, whereafter all channels can return to their original power level.

According to still a further embodiment of the invention, an optical network is provided, wherein the optical network includes at least one span, and wherein an optical signal having a plurality of sub-bands travels through at least one span of the at least one span of the optical network, wherein each span has associated amplifiers, wherein the associated amplifiers are connected to launch optical signals into a remainder of a corresponding optical transmission line, and wherein respectively one of the sub-bands of the optical signal traveling through the span is amplified by one of these associated amplifiers, wherein each of the associated amplifiers includes at least one control element for controlling gain and tilt of the corresponding amplifier, and wherein the optical network further comprises a detecting device, wherein the detecting device is configured to, for each span, acquire an actual value of at least one performance parameter of the corresponding span and a network control device as described above.

Thus, an optical network, for example an optical multi-span network, that comprises an improved network control device that is configured to adjust gain of optical amplifiers in a multiband system is provided, with which the OSNR of all channels can be kept almost equal even in case of transient effects. Therein, as the network control device is configured to simply adjust the settings of the control elements, a fast adaption of the control elements is achieved, which allows fast gain and output power adjustment of the corresponding amplifiers in case of a transient effect, which is for example much faster than trying to change an inversion level of the corresponding amplifier. In particular, the corresponding amplifiers, or the output of the corresponding amplifiers, respectively, can be controlled in such a way that strong transients in the optical network can be avoided, whereby the transient system performance can be improved.

Here, the detecting device can be a sensing device or any other device that is configured to obtain actual values of the at least one performance parameter. For example, the at least one performance parameter can include input powers of signals respectively inputted in the amplifiers associated to the corresponding span and the detecting device can be a measurement device, for example a photodiode.

Therein, the sub-bands can include the C-band and the L-band, wherein the combination of the C-band and the L-band is the combination that is usually used in most optical multiband networks.

Embodiments of the invention will now be described with reference to the drawings.

DESCRIPTION OF THE INVENTION

Figure 1:
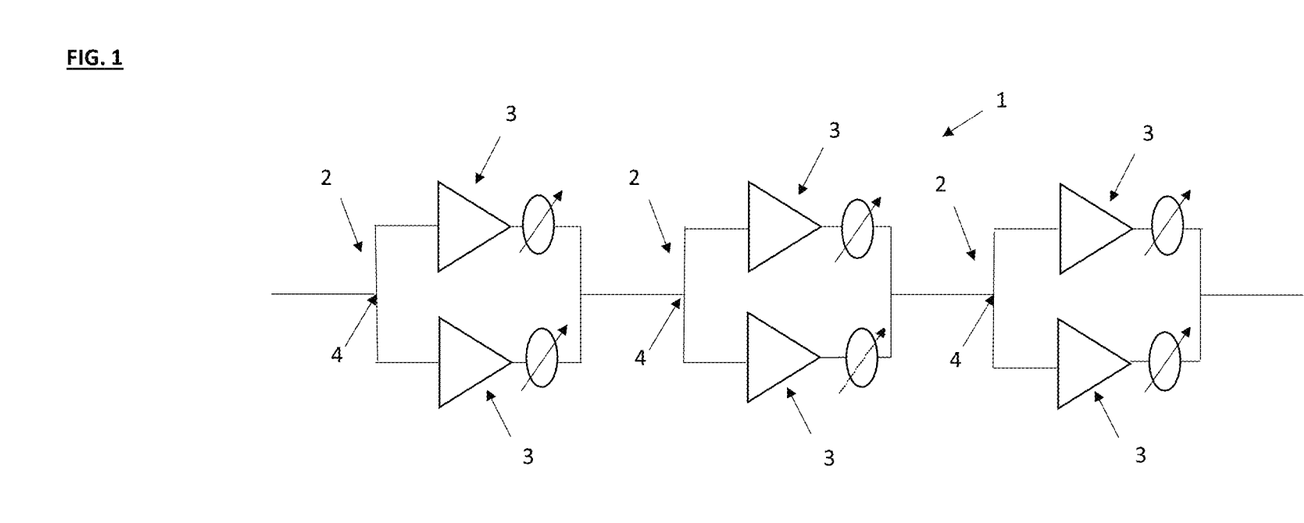
FIG. 1 illustrates a sample section of an optical multi-span network.

FIG. 1 illustrates a sample section 1 of an optical multi-span network.

Therein, the sample section 1 of an optical multi-span network is part of a wavelength-division multiplexing (WDM) network.

Further, in the section 1 of the optical multi-span network, an ingress WDM node is connected to an egress WDM node via spans 2 of optical fiber. The spans 2 of optical fiber are further coupled via amplifiers 3, in particular optical amplifiers.

According to the embodiments of FIG. 1, an optical signal having a plurality of sub-bands travels through the spans 2 of fiber. At each intermediate amplification node 4, the corresponding optical spectrum is split into different wavelength bands by a band splitter. The channels of each wavelength band are then amplified in a separate optical amplifier 3. Thereafter, the wavelength bands are recombined again and transmitted over the next span 2.

Therein, stimulated Raman scattering in the transmission fiber causes power transfer among different wavelength channels and also across the borders of the wavelength bands. In particular, power is transferred from smaller wavelengths to larger wavelengths.

In section 1 of the optical multi-span network shown, launching all wavelength channels at the same power into the fiber would lead to larger differences in channel power at the end of the span. This, however, would lead to a very poor OSNR of the smaller wavelength channels at the end of the corresponding transmission fiber. Therefore, usually a pre-tilt is introduced into the spectrum at the beginning of each span 2 by decreasing the channel power at the fiber input or the output, respectively, of a previous amplifier with increasing wavelength, so that, in the ideal case, all wavelength channels have the same power at the end of each span and an almost equal OSNR is achieved for all wavelength channels at a corresponding receiver. Here, the tilt of a spectrum is defined as the slope of a straight line fitting the logarithmic channel powers in a least-squares sense. This slope increases with increasing total power launched into the transmission fiber.

However, there might for example be problems in case of transient effects, for example a drop of channels, which might arise for example due to a fiber cut. Therein, due to the reduced power launched into the transmission fiber after the channel drop, the tilt induced by stimulated Raman scattering in the fiber is lowered. On the other hand, the tilt of the input spectrum does not change when operating the amplifiers in a gain control and the channels at larger wavelengths experience a power drop.

In order to avoid these problems, it is correspondingly required to reduce the tilt of the amplifiers 3. However, it is very time-consuming to change the tilt of amplifiers 3, and, in particular, of rare-earth doped amplifiers. In particular, adjustment of the tilt of rare-earth doped amplifiers usually requires to change the average inversion, for example the average population probability of the metastable level. As this is, however, quite a slow process compared with stimulated Raman scattering, there are usually noticeable power deviations at the end of the span 2 for a certain period of time, wherein the corresponding transient response time can amount to several milliseconds.

Therefore, there is a need for an improved method for adjusting the gain of optical amplifiers in a multiband system, with which the OSNR of all channels can be kept almost equal even in case of transient effects.

Figure 2:
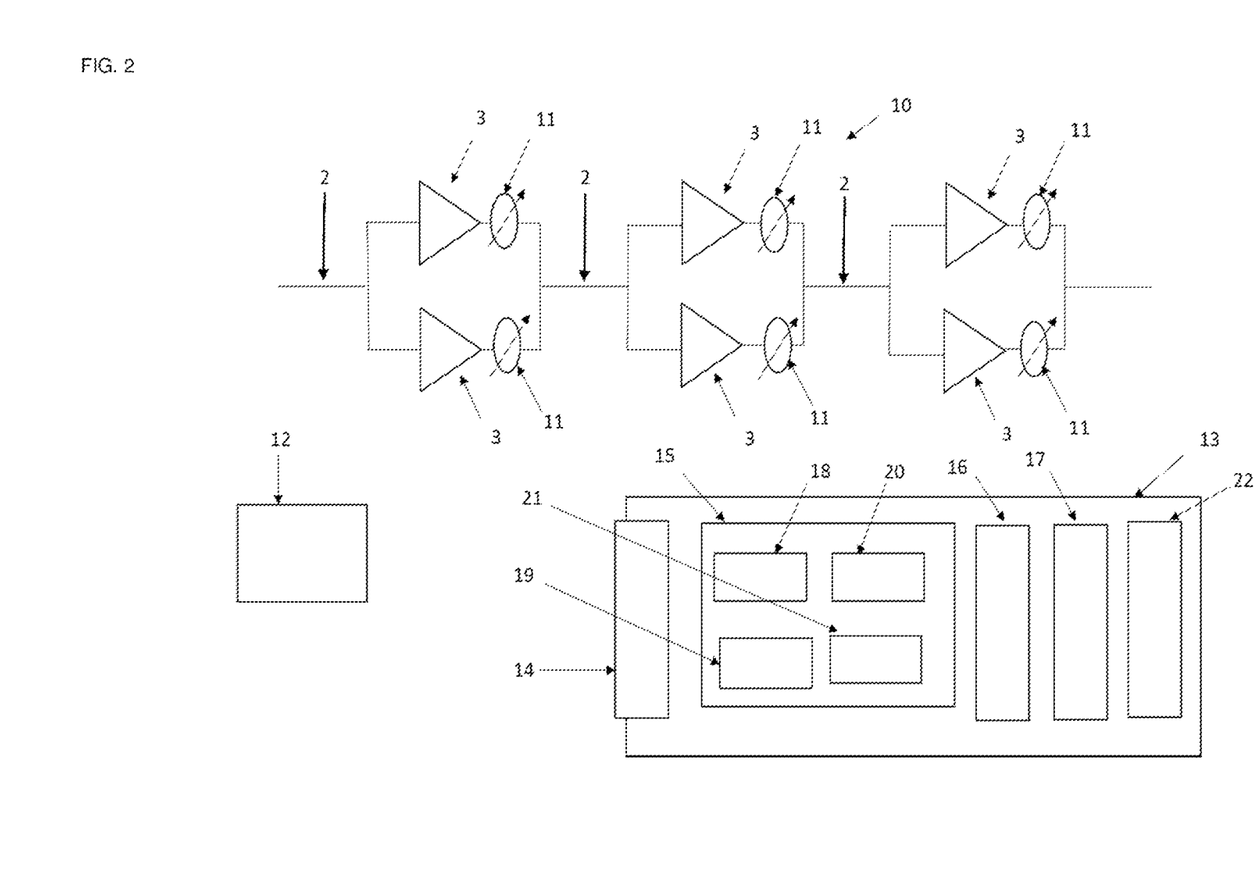
FIG. 2 illustrates an optical multi-span network according to embodiments of the invention.

FIG. 2 illustrates a section of an optical multi-span network 10 according to embodiments of the invention.

As shown in FIG. 2, the sample section 10 of an optical multi-span network comprises a section 1 of an optical multi-span network as shown in FIG. 1, wherein the same elements as in FIG. 1 are given the same reference numbers as in FIG. 1 and are not discussed in any further detail here.

According to the embodiments of FIG. 2, each of the amplifiers 3 includes a control element for controlling gain and tilt of the corresponding amplifier, wherein, according to the embodiment of FIG. 2, the control elements respectively are variable optical attenuators 11. Here, the actual amplifier 3 and the variable optical attenuator 11 are respectively shown being separated from each other. However, each optical amplifier may also be an amplifier in which a variable optical attenuator is integrated. The amplifiers 3 can for example be rare-earth doped amplifiers. For example, the amplifiers 3 can be erbium-doped fiber amplifiers (EDFAs) which ensure that the amplifiers 3 operate with the lowest possible noise figure regardless of a corresponding launch power.

According to the embodiments of FIG. 2, the section 10 of an optical multiband network 10 further comprises a detecting device 12, wherein the detecting device 12 is configured to, for each span, acquire an actual value of at least one performance parameter of the corresponding span and a network control device 13 for reducing the impact of transient effects in the optical multi-span network 10. In particular, the optical multiband network 10 further comprises a network control device 13 for reducing the impact of transient effects in the optical multi-span network, wherein the network control device 13 comprises a first receiving device 14, wherein the first receiving device 14 is configured to, for each span, receive information about an actual value of at least one performance parameter of the corresponding span, a computing device 15, wherein the computing device 15 is configured to, for each span 2, respectively compute actual settings for each of the variable optical attenuators 11 included in the amplifiers 3 associated to the corresponding span 2 based on the information about the actual value of the at least one performance parameter, and a first adjustment device 16, wherein the first adjustment device 16 is configured to, for each span 2, respectively adjust the settings of the variable optical attenuators 11 included in the amplifiers 3 associated to the corresponding span 2 based on the computed actual settings for the corresponding variable optical attenuator 11, in order to reduce the impact of transient effects.

Thus, an improved network control device 13 that is configured to adjust gain of optical amplifiers in a multiband system is provided, with which the OSNR of all channels can be kept almost equal even in case of transient effects. Therein, as the network control device 13 is configured to simply adjust the settings of the variable optical attenuators 11, a fast adaption of the variable optical attenuators 11 is achieved, which allows fast gain and output power adjustment of the corresponding amplifiers 3 in case of a transient effect, which is for example much faster than trying to change an inversion level of the corresponding amplifier 3. In particular, the corresponding amplifiers 3, or the output of the corresponding amplifiers 3, respectively, can be controlled in such a way that strong transients in the optical multi-span network 10 can be avoided, whereby the transient system performance can be improved.

However, there might also be a network control device located at every node in the optical network, in order to ensure sufficient speed of the corresponding control.

Therein, the first receiving device can for example be a receiver that is configured to receive corresponding signals. Further, the computing device and the first adjustment device can for example be realized by corresponding code that is stored in a memory and executable by a processor, or a corresponding actor, respectively.

The first detecting device can for example include a measurement device that is configured to respectively acquire the input power inputted into the amplifiers 3 associated with a span 2, for example photodiodes.

According to the embodiments of FIG. 2, the sub-bands include the C-band and the L-band. The C-band covers a wavelength range from approximately 1530 mm to 1565 mm and a frequency range from approximately 191.6 THz to 196.0 THz. The L-band covers a wavelength range from approximately 1565 mm to 1625 mm and a frequency range from approximately 184.5 THz to 191.6 THz.

Further, the network control device 12 shown further comprises a second receiving device 17, wherein the second receiving device 17 is configured to detect whether a drop of wavelength channels occurred, wherein first receiving device 14 is configured to, for each span, receive the information about the actual value of the at least one performance parameter only if the second receiving device 17 has received information that a drop of wavelength channels occurred.

Therein, the second detecting device can for example be a receiver that is configured to receive information about a fiber cut and/or other issues that usually result in a channel drop.

Furthermore, the at least one performance parameter includes input powers of signals respectively inputted into the amplifiers 3 associated to the corresponding span.

According to the embodiments of FIG. 2, the computing device 15 further comprises a first computing unit 18, wherein the first computing unit 18 is configured to, for each of the amplifiers 3 associated to the corresponding span 2, compute an actually required tilt coefficient, and a second computing unit 19, wherein the second computing unit 19 is configured to, for each variable optical attenuator 11 included in the amplifiers 3 associated to the corresponding span 2, respectively compute the actual settings for the corresponding variable optical attenuator 11 based on the information about the actual value of the at least one performance parameter of the corresponding span and the corresponding actually required tilt coefficient.

For example, directly after a drop of C-band channels, less power is transferred to the L-band channels in the transmission fiber and the power of all channels decreases at the output of the corresponding transmission fiber. Therein, the network control device 13 is for example configured to respectively reduce the attenuation of the corresponding variable optical attenuators 11 in such a way that the average power of the L-band channel returns to the value before the channel drop at the output of the fiber. Thereafter, the tilt of the corresponding amplifiers 3 can still be adapted to the new power levels, which is, however, a much more time-consuming process, and all channels can return to their original power levels.

Further, the computing device 15 also comprises a third computing unit 20, wherein the third computing unit 20 is configured to, for each of the variable optical attenuators 11 included in the amplifiers 3 associated to the corresponding span 2, compute a correction factor, and a fourth computing unit 21, wherein the fourth computing unit 21 is configured to, for each of the variable optical attenuators 11 included in the amplifiers 3 associated to the corresponding span 2, respectively compute the actual settings for the corresponding variable optical attenuator based on the information about the actual value of the at least one performance parameter and the correction factor.

There is further shown a second adjustment device 22, wherein the second adjustment device 22 is configured to, for each span, respectively adjust a pre-tilt of the amplifiers 3 associated to the span 2 based on the actually required tilt coefficient. Thus, the network control device 13 shown is configured to adjust the gain and the tilt of the amplifiers 3 in a multiband system in a two-phase process, wherein in a first phase the settings of a corresponding variable optical attenuator 11 are adjusted, which allows fast gain and output power adjustment of the corresponding amplifiers 3 in case of a transient effect, which is for example much faster than trying to change an inversion level of the corresponding amplifier 3. Thereafter, in a second phase, the tilt of the corresponding amplifier 3 can be adjusted, which is a much more time-consuming process, whereafter all channels can return to their original power level.

Therein, the amplifiers configured to amplify one of the wavelength bands, or to individually adapt the average channel power per wavelength band, respectively, can be located on different, neighboring amplifier cards, wherein the corresponding power levels can for example be communicated between these neighboring amplifier cards via a backplane by means of some high-speed connections, by means of RF cables or optical fibers, or by free space optical communication at the boundaries of neighboring amplifier cards.

Figure 3:
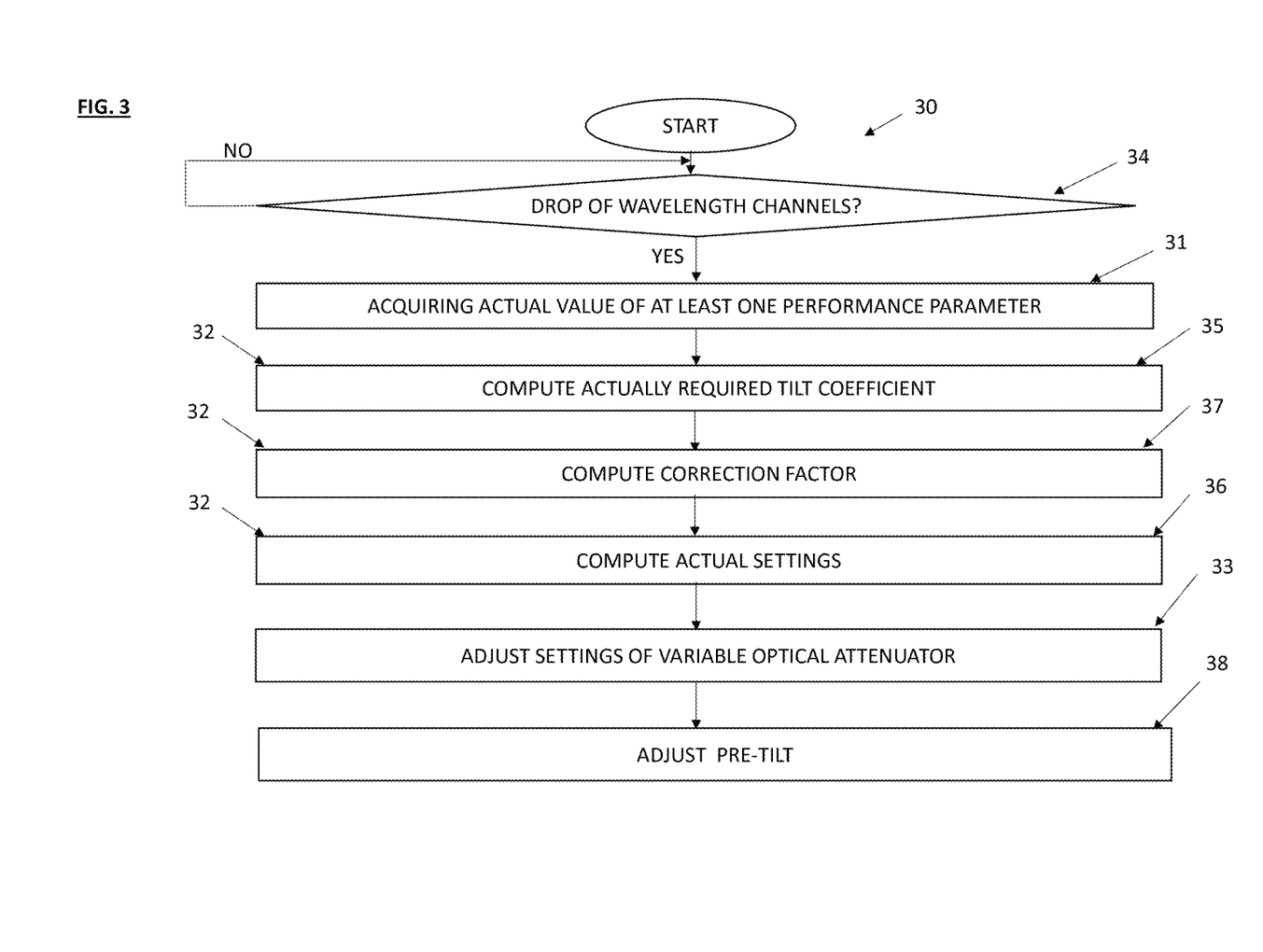
FIG. 3 illustrates a flowchart of a method for reducing the impact of transient effects in an optical network according to embodiments of the invention.

FIG. 3 illustrates a flowchart of a method 30 for reducing the impact of transient effects in an optical network according to embodiments of the invention.

In particular, FIG. 3 illustrates a flowchart of a method 30 for reducing the impact of transient effects in an optical network, wherein the optical network includes at least one span, and wherein an optical signal having a plurality of sub-bands travels through at least one span of the at least one span of the optical network, wherein each span has associated amplifiers, wherein the associated amplifiers are connected to launch optical signals into a remainder of a corresponding optical transmission line, and wherein respectively one of the sub-bands of the optical signal traveling through the span is amplified by one of these associated amplifiers, wherein each of the associated amplifiers includes at least one control element for controlling gain and tilt of the amplifier. Therein, the method 30 comprises a step 31 of, for each span, acquiring an actual value of at least one performance parameter of the optical multiband network, a step 32 to, for each span, respectively compute actual settings for each of the control elements included in the amplifiers associated to the corresponding span based on the actual value of the at least one performance parameter, and a step 33 to, for each span, respectively adjust the settings of each of the control elements included in the amplifiers associated to the corresponding span based on the computed actual settings for the corresponding control element, in order to reduce the impact of transient effects.

According to the embodiments of FIG. 3, the method 30 further comprises a step 34 of detecting whether a drop of one or more wavelength channels occurred, wherein the actual value of the at least one performance parameter is only acquired if it has been detected that a drop of one or more wavelength channels occurred. If it is, however, detected in step 34 that a drop of one or more wavelength channels has not occurred, step 34 is repeated.

Further, the sub-bands again include the C-band and the L-band.

Furthermore, the at least one performance parameter includes input powers of signals respectively inputted into the amplifiers associated with the corresponding span. By acquiring actual values of the input powers of the signals respectively inputted into the individual amplifiers, a feedforward control of the optical amplifiers is achieved with which the system performance in case of a transient effect can be improved.

According to the embodiments of FIG. 3, the step 32 to, for each span, respectively compute actual settings for each of the control elements included in the amplifiers associated with the corresponding span based on the actual value of the at least one performance parameter further comprises a step 35 of, for each of the amplifiers associated to the corresponding span, respectively computing an actually required tilt coefficient, and a step 36 of, for each of the control elements included in the amplifiers associated to the corresponding span, respectively computing the actual settings for the corresponding control element based on the actual value of the at least one performance parameter of the corresponding span and the actually required tilt coefficient of the corresponding amplifier, wherein tilt adjustment can also be done by adapting the settings of the corresponding control element.

In particular, according to the embodiments of FIG. 3, there are respectively two amplifiers associated to a span, in particular a first amplifier to amplify the C-band and a second amplifier to amplify the L-band, wherein the average channel power is adapted individually per wavelength band to reduce the impact of transient effects. Therein, the actually required tilt coefficient $\gamma_{tilt}$ is respectively correlated with the spectral width of the spectrum $W_{spectrum}$, wherein $W_{spectrum}$ is defined by $$W_{spectrum} = \sqrt{\frac{m_2}{m_0} - \left(\frac{m_1}{m_0}\right)^2}, \quad (1)$$

with the moments $$m_n = \int_{f_{min}}^{f_{max}} P(f) \, f^n df \quad (2),$$

wherein $f_{min}$ and $f_{max}$ are the lower limit or the upper limit, respectively, of the corresponding frequency band, and wherein P(f) represents the channel power as a function of the frequency.

Therein, as the actually required tilt coefficient $\gamma_{tilt}$ is correlated with the spectral width of the spectrum $W_{spectrum}$, the actually required tilt coefficient $\gamma_{tilt}$ can be derived based on the computed spectral width of the spectrum $W_{spectrum}$.

Thereafter, the output powers of the C-band and the L-band can respectively be computed from the total power $P_{tot}$ launched into the fiber.

For a linear increase of the channel power with frequency and equal spreading of the channels of the respective bands, the output power of the C-band $P_{OUT}^{(C)}$ can be computed according to $$P_{OUT}^{(C)} = \frac{P_{in}^{(C)} * \vartheta_{tilt}}{P_{in}^{(C)} * \vartheta_{tilt} + P_{in}^{(L)}} * P_{tot}, \quad (3)$$

and the output power of the L-band $P_{OUT}^{(L)}$ can be computed according to $$P_{OUT}^{(L)} = \frac{P_{in}^{(L)}}{P_{in}^{(C)} * \vartheta_{tilt} + P_{in}^{(L)}} * P_{tot}, \quad (4)$$

wherein it is assumed that both bands have equal width in the frequency domain, in particular that $$f_{max}^{(C)} - f_{min}^{(C)} = f_{max}^{(L)} - f_{min}^{(L)} \quad (5),$$

wherein $P_{in}^{(C)}$ and $P_{in}^{(L)}$ are the corresponding input powers acquired after the channel drop, wherein the total output power after the channel drop can be computed based on the settings of the amplifiers and $P_{in}^{(C)}$ and $P_{in}^{(L)}$, and wherein $$\vartheta_{tilt} = \exp\{\gamma_{tilt} * P_{tot} * (f_{min}^{(C)} - f_{min}^{(L)})\} \quad (6).$$

On the other hand, in situations where the bands have different widths in the frequency domain, the output power of the C-band $P_{OUT}^{(C)}$ can be computed according to $$P_{OUT}^{(C)} = P_{tot} * \frac{\tau_C}{\tau_C + \tau_L}, \quad (7)$$

and the output power of the L-band $P_{OUT}^{(L)}$ can be computed according to $$P_{OUT}^{(C)} = P_{tot} * \frac{\tau_L}{\tau_C + \tau_L}, \quad (8)$$

-continued wherein $$\tau_C = \frac{P_{in}^{(C)}}{f_{max}^{(C)} - f_{min}^{(C)}} [\exp\{\gamma_{tilt} * P_{tot} * f_{max}^{(C)}\} - \exp\{\gamma_{tilt} * P_{tot} * f_{min}^{(C)}\}], \quad (9)$$

and wherein $$\tau_L = \frac{P_{in}^{(L)}}{f_{max}^{(L)} - f_{min}^{(L)}} [\exp\{\gamma_{tilt} * P_{tot} * f_{max}^{(L)}\} - \exp\{\gamma_{tilt} * P_{tot} * f_{min}^{(L)}\}]. \quad (10)$$

Thus, the method spreads the total signal power over the signal bands depending on the tilt coefficient and the spectral ranges used. Furthermore, the tilt coefficient might be calculated from the unweighted or weighted spectral width.

Based on the computed values for the output powers and the acquired values of the input powers, the gain values of the corresponding amplifiers are also known, and the settings of the corresponding control element can also easily be obtained.

As the above-described feedforward control sets the average channel power, for example the average channel power in the C-band to the value it would assume in the ideal case without adjusting the tilt, there might be situations where the power of some larger wavelength channels already drops before their corresponding power with ideal control based on the feedforward control. This can be avoided by slightly reducing the decrease in the attenuation of the control element, so that no channel power falls below its value for the ideal control.

Therein, according to the embodiments of FIG. 3, the step 32 of, for each span, computing actual settings for each of the control elements included in the amplifiers associated with the corresponding span based on the actual value of the at least one performance parameter further comprises a step 37 of, for each of the control elements included in the amplifiers associated with the corresponding span, computing a correction factor, wherein, for each of the control elements included in the amplifiers associated with the corresponding span, the actual settings for the corresponding control element are respectively computed based on the actual value of the at least one performance parameter and the correction factor.

The correction factor can be a shift value that is used to slightly reduce or shift, respectively, the decrease in the attenuation of the corresponding control element determined by the feedforward control, wherein this correction factor can be computed according to $$F_C = 10^{\left\{\frac{\Delta S_{tilt}}{20} * (f_{max}^{(C)} - f_{min}^{(C)}) * \frac{P_{in}^{(C,after\ drop)}}{P_{in}^{(C,before\ drop)}}\right\}}, \quad (11)$$

wherein $\Delta S_{tilt}$ is the difference of the tilt value before the drop and the tilt value that can be derived based on the feedforward-control as described above, wherein $P_{in}^{(c,after\ drop)}$ is the total input power in the C-band before the drop, and wherein $P_{in}^{(C,after\ drop)}$ is the total input power in the C-band after the drop.

According to the embodiments of FIG. 3, the method 30 further comprises the step 38 of, for each span, respectively adjusting a pre-tilt of the amplifiers associated to the span based on the actually required tilt coefficient computed for the corresponding amplifier.

REFERENCE SIGNS 1 segment of an optical multi-span network
2 span
3 amplifier
4 amplification node
10 segment of an optical multi-span network
11 variable optical attenuator
12 detecting device
13 network control device
14 first receiving device
15 computing device
16 first adjustment device
17 second detecting device
18 first computing unit
19 second computing unit
20 third computing unit
21 fourth computing unit
22 second adjustment device
30 method
31 method step
32 method step
33 method step
34 method step
35 method step
36 method step
37 method step
38 method step

The invention claimed is:

1. A method for reducing impact of transient effects in an optical network, wherein the optical network includes at least one span, and wherein an optical signal having a plurality of sub-bands travels through the at least one span of the optical network, wherein each of the at least one span has associated amplifiers, wherein the associated amplifiers are connected to launch optical signals into a remainder of a corresponding optical transmission line, and wherein respectively one of the sub-bands of the optical signal travelling through the at least one span is amplified by one of these associated amplifiers, and wherein each of the associated amplifiers includes at least one control element for controlling gain and tilt of the corresponding amplifier, wherein the method comprises the steps of:
   acquiring for each span an actual value of at least one performance parameter;
   computing for each span respectively actual settings for each of the control elements included in the amplifiers associated to the corresponding span based on the actual value of the at least one performance parameter of the corresponding span; and
   adjusting for each span respectively the settings of each of the control elements included in the amplifiers associated to the corresponding span based on the computed actual settings for the corresponding control element, in order to reduce the impact of transient effects.

2. The method according to claim 1, wherein the method further comprises detecting whether a drop of one or more wavelength channels occurred, and wherein, for each span, the actual value of the at least one performance parameter is only measured if it has been detected that a drop of one or more wavelength channels occurred.

3. The method according to claim 1, wherein the sub-bands include the C-band and the L-band.

4. The method according to claim 1, wherein the at least one performance parameter includes input powers of signals respectively inputted into the amplifiers associated to the corresponding span.

5. The method according to claim 1, wherein the step of, for each of the at least one span, respectively computing actual settings for each of the control elements included in the associated amplifiers based on the at least one performance parameter of the corresponding span, further comprises the steps of:
for each of the amplifiers associated to the corresponding span, computing an actually required tilt coefficient; and
for each control element included in the amplifiers associated to the corresponding span, respectively computing the actual settings for the corresponding control element based on the at least one performance parameter of the corresponding span and the actually required tilt coefficient of the corresponding amplifier.

6. The method according to claim 1, wherein the step of, for each span, respectively computing actual settings for each of the control elements included in the amplifiers associated to the corresponding span based on the actual value of the at least one performance parameter of the corresponding span further comprises the steps of:
for each of the variable control elements included in the amplifiers associated to a span, respectively computing a correction factor; and
for each of the control elements included in the amplifiers associated to the span, computing the actual settings for the corresponding control element based on the at least one performance parameter of the corresponding span and the correction factor.

7. The method according to claim 5, wherein the method further comprises the step of:
for each of the at least one span, respectively adjusting a pre-tilt of the amplifiers associated to the span based on the corresponding actually required tilt coefficient.

8. A network control device for reducing the impact of transient effects in an optical network, wherein the optical network comprises:
at least one span, and wherein an optical signal having a plurality of sub-bands travels through the at least one span of the optical network, wherein each of the at least one span has associated amplifiers, wherein the associated amplifiers are connected to launch optical signals into a remainder of a corresponding optical transmission line, and wherein respectively one of the sub-bands of the optical signal travelling through the span is amplified by one of these associated amplifiers, wherein each of the associated amplifiers includes at least one control element for controlling gain and tilt of the corresponding amplifier,
wherein the network control device comprises:
a first receiving device, wherein the first receiving device is configured to, for each of the at least one span, receive information about an actual value of at least one performance parameter of the span,
a computing device, wherein the computing device is configured to, for each of the at least one span, respectively compute actual settings for each of the control elements included in the amplifiers associated to the corresponding span based on the information about the actual value of the at least one performance parameter of the corresponding span, and
a first adjustment device, and wherein the first adjustment device is configured to, for each of the at least one span, respectively adjust the settings of each of the control elements included in the amplifiers associated to the corresponding span based on the computed actual settings for the corresponding control element, in order to reduce the impact of transient effects.

9. The network control device according to claim 8, wherein the network control device further comprises a second receiving device, wherein the second receiving device is configured to receive information about whether a drop of wavelength channels occurred, and wherein the first receiving device is configured to, for each of the at least one span, receive the information about the actual value of the at least one performance parameter only if the second receiving device has received information that a drop of wavelength channels occurred.

10. The network control device according to claim 8, wherein at least one performance parameter includes input powers of signals respectively inputted into the amplifiers associated to the corresponding span.

11. The network control device according to claim 8, wherein the computing device further comprises a first computing unit, wherein the first computing unit is configured to, for each of the amplifiers associated to the corresponding span, compute an actually required tilt coefficient, and a second computing unit, and wherein the second computing unit is configured to, for each of the control elements included in the amplifiers associated to the corresponding span, compute the actual settings for the corresponding control element based on the information about the actual value of the at least one performance parameter of the corresponding span and the actually required tilt coefficient of the corresponding associated amplifier.

12. The network control device according to claim 8, wherein the computing device further comprises a third computing unit, wherein the third computing unit is configured to, for each of the control elements included in the amplifiers associated to a span, compute a correction factor, and a fourth computing unit, and wherein the fourth computing unit is configured to, for each of the control elements included in the amplifiers associated to the span, respectively compute the actual settings for the corresponding variable control element based on the information about the actual value of the at least one performance parameter of the corresponding span and the correction factor.

13. The network control device according to claim 11, wherein the network control device further comprises a second adjustment device, and wherein the second adjustment device is configured to, for each of the at least one span, respectively adjust a pre-tilt of the amplifiers associated to the span based on the actually required tilt coefficient of the corresponding amplifier.

14. The optical network and the network control device according to claim 8, wherein the optical network includes at least one span, and wherein an optical signal having a plurality of sub-bands travels through at least one of the at least one span of the optical network, wherein each of the at least one span has associated amplifiers, wherein the associated amplifiers are connected to launch optical signals into a remainder of a corresponding optical transmission line, and wherein respectively one of the sub-bands of the optical signal travelling through the span is amplified by one of these associated amplifiers, wherein each of the associated amplifiers includes at least one control element for controlling gain and tilt of the corresponding amplifier, and wherein the optical network further comprises a detecting device, and wherein the detecting device is configured to, for each of the at least one span, acquire an actual value of at least one performance parameter of the corresponding span.

15. The optical network according to claim 14, wherein the sub-bands include the C-band and the L-band.

* * * * *

UNITED STATES PATENT AND TRADEMARK OFFICE
CERTIFICATE OF CORRECTION

| | | |
|---|---|---|
| PATENT NO. | : 12,155,415 B2 | Page 1 of 1 |
| APPLICATION NO. | : 17/970730 | |
| DATED | : November 26, 2024 | |
| INVENTOR(S) | : Lutz Rapp | |

It is certified that error appears in the above-identified patent and that said Letters Patent is hereby corrected as shown below:

On the Title Page

Column 1, Prior Publication Data, below:
"US 2023/0129521 A1 Apr. 27, 2023"
Insert item (30):
-- Foreign Application Priority Data Oct. 22, 2021 (EP) ..................... 21204152 --

Signed and Sealed this
Eighth Day of April, 2025

Coke Morgan Stewart
*Acting Director of the United States Patent and Trademark Office*